United States Patent [19]

Gupta

[11] Patent Number: 4,961,187

[45] Date of Patent: Oct. 2, 1990

[54] PBX SYSTEM WITH ASSIGNABLE RELATIONSHIPS BETWEEN NETWORK LOOPS AND PORTS

[75] Inventor: Vijay K. Gupta, Cupertino, Calif.

[73] Assignee: BNR Inc., Mountain View, Calif.

[21] Appl. No.: 392,466

[22] Filed: Aug. 11, 1989

[51] Int. Cl.[5] .......................... H04J 3/02; H04Q 11/04
[52] U.S. Cl. ............................. 370/85.120; 370/59.2; 370/67
[58] Field of Search .................. 370/85.14, 85.9, 85.12, 370/85.11, 67, 58.1, 58.2, 58.3, 59

[56] References Cited

U.S. PATENT DOCUMENTS 3,856,993 12/1974 Closs et al. ........................ 370/85.14
4,069,399 1/1978 Barrett et al. ........................ 370/67
4,694,452 9/1987 Beckinger et al. ................. 370/58.2
4,791,629 12/1988 Burns et al. ........................ 370/58.2
4,791,639 12/1988 Afheldt et al. ..................... 370/58.1

Primary Examiner—Douglas W. Olms
Assistant Examiner—Christopher O. Edwards
Attorney, Agent, or Firm—Morrison Law Firm

[57] ABSTRACT

A peripheral controller for a PBX system accepts PCM data from a plurality of channels. The channels may be processed in time and space switches of more than one network loop. A channel-merge device merges the PCM data into a combined PCM data stream for connection to a time switch. The time switch is controlled by a connection memory to direct data on specific channels to specific terminals.

8 Claims, 3 Drawing Sheets

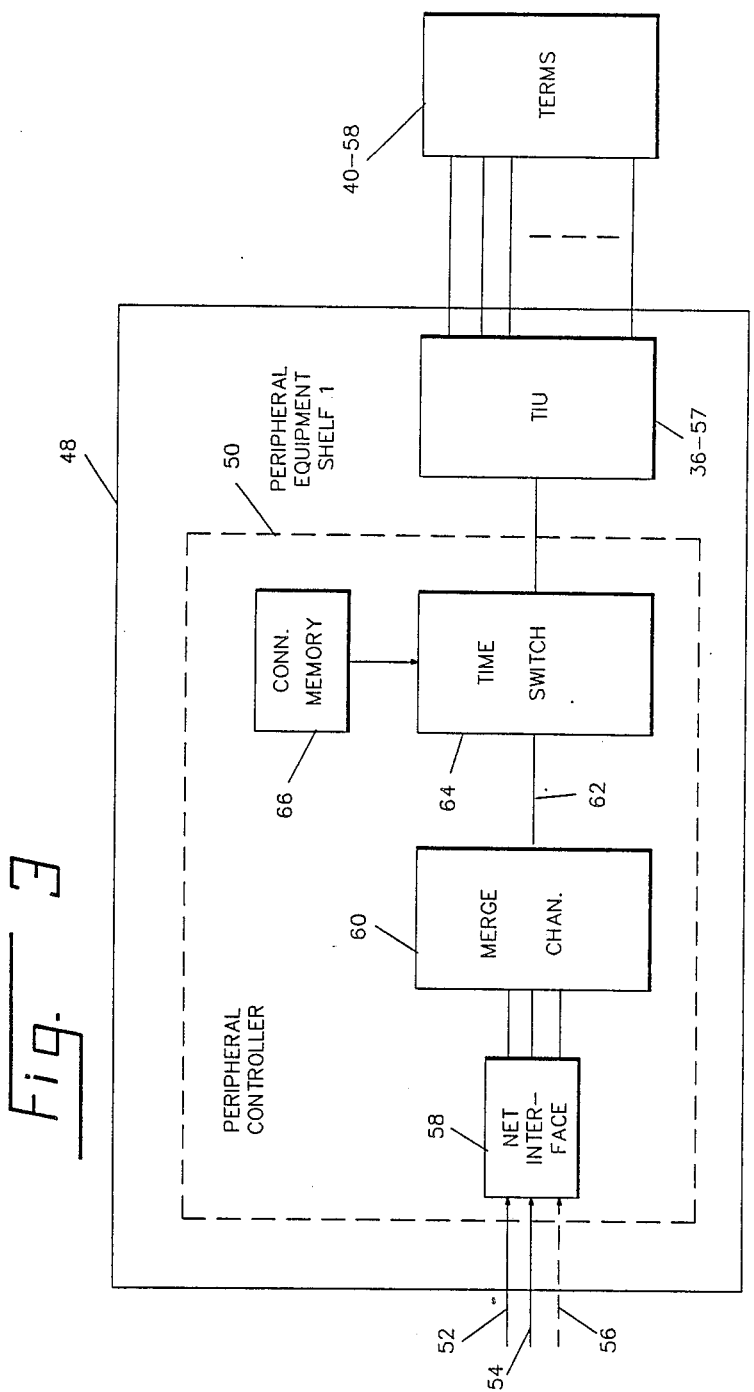

PBX SYSTEM WITH ASSIGNABLE RELATIONSHIPS BETWEEN NETWORK LOOPS AND PORTS

BACKGROUND OF THE INVENTION

The present invention relates to PBX systems and, more particularly, to digital PBX systems in which a plurality of signals are pulse-code-modulated for transmission on a data bus.

A conventional digital PBX system such as, for example, one disclosed in U.S. Pat. No. 4,069,399, employs at least one bus carrying a plurality of multiplexed digital data signals for delivery to, and/or for reception from, a plurality of terminals (telephone instruments, data sets, central office trunks, T1 carrier facilities). The data on the bus is sorted by time and space switches in a plurality of network modules or loops to yield a plurality of data streams. Each data stream is made up of a first plurality of time slots, conventionally 32 time slots in a frame, and a second plurality of frames, conventionally 8 frames, making up a main frame. A data word is an 8-bit word consisting of one bit from a corresponding time slot in each of the 8 frames making up a main frame. Normally, one of the 32 time slots is devoted to signalling information, and a second one is reserved, thus leaving 30 time slots for the transmission of data.

The interface between the network and its terminals takes place in line cards. Each line card is capable of serving from one to about 8 terminals. The total number of terminals that can be served by a loop depends on the quality of service that is desired, as is described below.

A conventional measure of throughput in a PBX system is in hundreds of channel seconds per hour, usually abbreviated CCS. Each channel provides 36 CCS (there are 3600 seconds per hour). The loop is capable of providing 36 CCS times the number of time slots available for communication in the loop. In the case of a loop having 30 time slots available (32 time slots less one signalling time slot and one reserved time slot), the loop capacity is 36×30=1080 CCS. If fully non-blocking operation is desired, then each terminal requires 36 CCS. In such a case, only 30 terminals can be accommodated. In fact, however, many applications require far less than 36 CCS. In motel/hotel use, for example, a typical terminal may require only 2 or 3 CCS. Other applications may require channels using anywhere from one or two to 36 CCS. Accordingly, it is possible for one conventional loop to serve many more than 30 terminals.

If somewhat less than full non-blocking operation is required, some degradation in service is anticipated since there is a probability that communications may be desired when no channel capacity remains available. Service degradation can be predicted with some degree of accuracy, depending on the applications of the particular terminals. As long as it is infrequent enough to be no more than a minor inconvenience, such service degradation can be tolerated. It is thus possible, and indeed is conventional, to continue to add terminals to a loop until a prediction of service degradation reaches a predetermined level.

A measure of grade of service (GOS) degradation is the probability of blocking. For a probability of blocking of about 0.01, the 30 channels of a conventional loop provide a total capacity of about 660 CCS. It will be noted that the total capacity is decreased from 1080 to about 660 CCS, in return for which the number of terminals which can be serviced is increased by a factor that depends on the type of service required on the terminals. In some applications, the number of terminals exceeds the number of channels (or available time slots) by a factor of 8.

In practice, line cards are packaged in peripheral equipment shelves. Each peripheral equipment shelf is capable of containing a predetermined maximum number of line cards such as, for example, 10 or 16. All line cards in a peripheral equipment shelf communicate with the same network loop. One network loop may communicate with the line cards in two or more peripheral equipment shelves. For economies in peripheral equipment shelves, as well as space and power conservation, it is desirable to employ substantially all of the capacity of peripheral equipment shelves.

The design of prior-art equipment contains no provision for matching the traffic capacity of its network loops (called loop capacity or channel capacity) with the needs of the terminals serviced by line cards in a peripheral equipment shelf. Normally, line cards are added to a peripheral equipment shelf until the loop capacity is utilized by an amount determined by the grade of service selected. If the loop capacity is not fully absorbed by the terminals connected to the line cards, a decision must be made whether to add a second peripheral equipment shelf to hold additional line cards to absorb the remainder of the loop capacity. If the remaining channel capacity is less than that which can be absorbed by terminals connected to a second full set of line cards in a second peripheral equipment shelf, then the decision entails either under-utilizing a peripheral equipment shelf, or under-utilizing channel capacity. If the second peripheral equipment shelf is supplied, then less than all of its full complement of line cards is required, thus under-utilizing the peripheral equipment shelf and increasing the usage of space and electricity. If the second peripheral equipment shelf is omitted, then the remaining unused channel capacity of the network loop is wasted. Neither of these alternatives is desirable.

A large PBX system, such as disclosed in the referenced patent, includes a plurality of network loops. In the prior art, each network loop is served by its own set of one or more peripheral equipment shelves. Thus, the inefficiencies in under-utilized peripheral equipment shelves or under-utilized channel capacity outlined above are multiplied by the number of network loops. The total number of unused areas in peripheral equipment shelves, and/or the total unused channel capacity due to decisions omitting additional partly utilized peripheral equipment shelves, can result in a significant reduction in PBX system performance.

OBJECTS AND SUMMARY OF THE INVENTION

It is an object of the invention to provide a PBX system wherein utilization of peripheral equipment shelves and network channel capacity is improved.

It is a further object of the invention to provide a PBX network switching system wherein a peripheral controller includes a time switch for permitting data to be communicated between more than one network loop and line cards on a single peripheral equipment shelf. In this manner, if the channel capacity of one network loop is fully consumed when a peripheral equipment shelf is only partly filled, additional channel capacity from a second loop can be fed to line cards in the peripheral equipment shelf so that the peripheral equipment shelf can be fully populated. If any channel capacity remains when a peripheral equipment shelf is fully populated, the remaining channel capacity can be absorbed by line cards in a subsequent peripheral equipment shelf.

Briefly stated, the present invention provides a peripheral controller for a PBX system which accepts PCM data from a plurality of channels. The channels may be processed in time and space switches of more than one network loop. A channel-merge device merges the PCM data into a combined PCM data stream for connection to a time switch. The time switch is controlled by a connection memory to direct data on specific channels to specific terminals.

According to an embodiment of the invention, there is provided a PBX system of a type including a bus for carrying digital data, comprising: at least first and second network loops, each of the first and second network loops including a first time switch and a space switch for communicating the digital data with the bus, at least one peripheral shelf, the at least one peripheral shelf including a peripheral controller, first means for communicating first digital data between the first network loop and the peripheral controller, means in the peripheral controller for combining the first and second digital data into a single third digital data, a plurality of terminals, a second time switch in the peripheral controller for directing portions of the third digital data to specific ones of the terminals, and a connection memory for relating the portions of the third digital data with the specific ones of the plurality of terminals, whereby a desired communications path is attainable.

According to a feature of the invention, there is provided a peripheral controller for a PBX system comprising: means for accepting a first plurality of channels of first digital data from a first network loop, means for accepting a second plurality of second digital data from a second network loop, means for combining the first plurality of channels with the second plurality of channels to produce a third digital data, means for communication portions of the digital data with at least first and second terminals, and the means for communicating including a time switch.

According to a further feature of the invention, there is provided a PBX system of a type including: a bus for carrying digital data, at least first and second network loops, each of the first and second network loops including a first time switch and a space switch for communicating the digital data with the bus, at least one peripheral shelf, the at least one peripheral shelf including a peripheral controller, first means for communicating first digital data between the first network loop and the peripheral controller, means in the peripheral controller for combining the first and second digital data into a single third digital data, a plurality of terminals, wherein the improvement comprises: a second time switch in the peripheral controller for directing portions of the third digital data to specific ones of the terminals, and a connection memory for relating the portions of the third digital data with the specific ones of the plurality of terminals, whereby a desired communications path is attainable.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3 is a simplified block diagram of a peripheral controller of FIG. 2.

DETAILED DESCRIPTION OF THE PREFERRED EMBODIMENT

Figure 1:
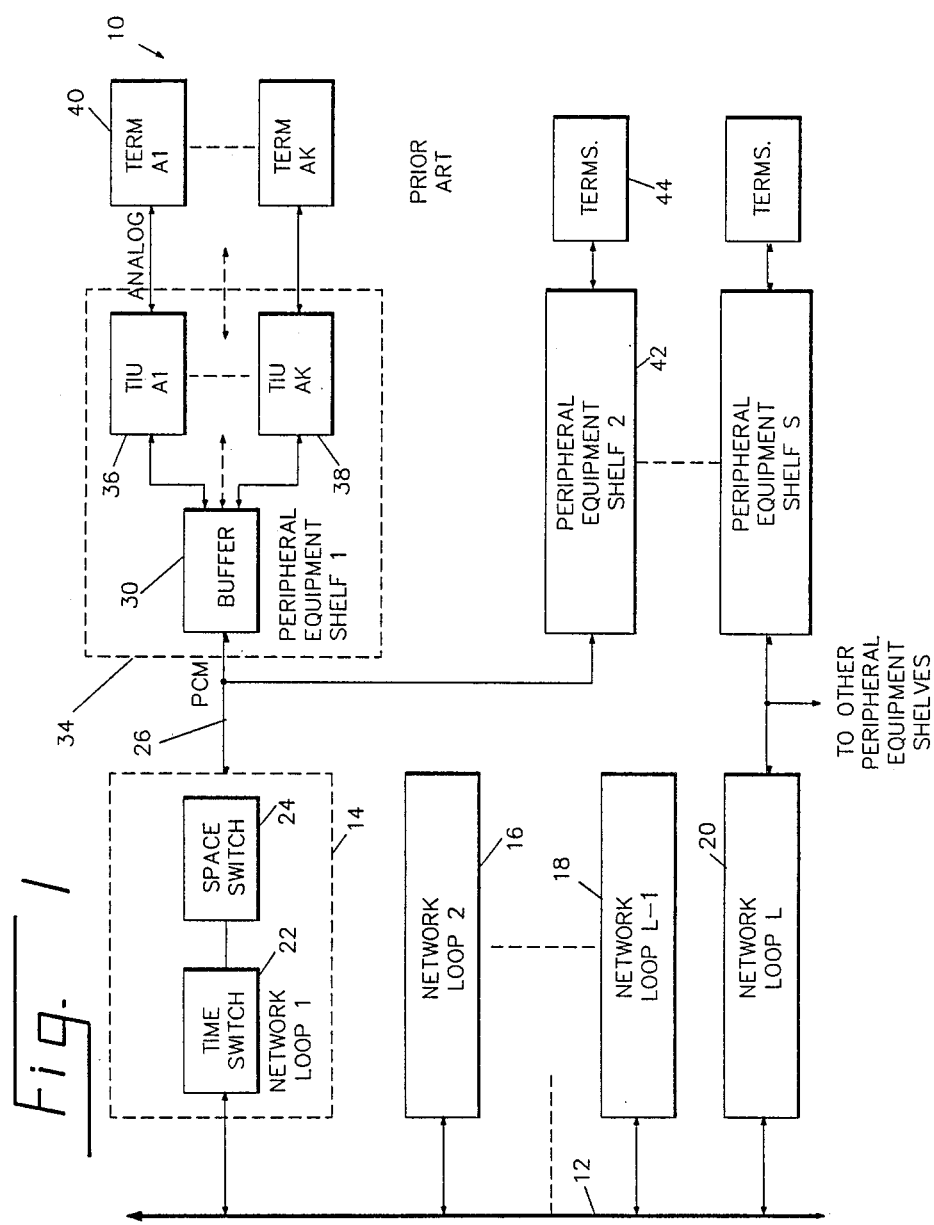
FIG. 1 is a simplified block diagram of a prior-art PBX system to which reference will be made in establishing the problem which the present invention sets out to solve.

Referring to FIG. 1, there is shown, generally at 10, a PBX system according to the prior art. For reference, PBX system 10 may be considered to be represented by the system disclosed in the above-reference patent. However, it is contemplated that other systems may equally provide the environment for the invention. Conventional elements not necessary to an understanding of the present invention are omitted from FIG. 1 and from the description thereof to reduce clutter and to make the present disclosure easier to understand. Such omitted elements include synchronizing and supervisory circuits and signals. If the reader wishes to review the relationships of such circuits and signals to the present invention, the reader may do so by reviewing the above-referenced patent, whose disclosure is herein incorporated by reference for background material.

A network bus 12 carries pulse-code-modulated (PCM), time-division-multiplexed (TDM) data at a high frequency of, for example, about 2.048 Megabits per second (Mbps). A plurality of network loops 14, 16, 18 and 20, receive PCM data from, and provide PCM data to, network bus 12.

All network loops are identical. Thus, only the content of network loop 14 is shown.

A time switch 22 selects PCM signals from network bus 12 that identify desired connections between pairs of its terminals. The selected signals from time switch 22 are connected to a space switch 24 wherein the PCM signals addressed to particular terminals are sorted out to feed PCM signals on a PCM loop 26 to a buffer 30 in a peripheral equipment shelf 34. One buffer 30 is provided per peripheral equipment shelf 34. Outputs of buffer 30 are connected to terminal interface units 36 through 38. Each terminal interface unit converts the PCM data it receives to a form compatible with its particular terminal 40. If, for example, terminal 40 is an analog telephone, terminal interface unit 36 converts between PCM signals available from buffer 30 to analog signals required by terminal 40.

PCM loop 26 is also connected to a second peripheral equipment shelf 42 which communicates, in turn, with a further plurality of terminals 44.

In a conventional system, the CCS requirements of each terminal 40 connected to peripheral equipment shelf 34 are added up. Further buffers, terminal interface units and terminals are added until the full CCS capacity, at the specified GOS is consumed. Then, corresponding equipment is added to peripheral equipment shelf 42 until the capacity of peripheral equipment shelf 42, or the channel capacity of network loop 14, is completely consumed. As noted in the description of the background of the invention, if the remaining channel capacity requires only part of the space in peripheral equipment shelf 42, it is clear that the costs of equipment, space and electrical power incurred by the addition of peripheral equipment shelf 42 is only partly utilized. This raises the need for a choice to be made between partial utilization of hardware and waste of channel capacity. In a system having a large number of network loops, the total cost consequences of such a choice, repeated for each network loop, can be considerable.

Figure 2:
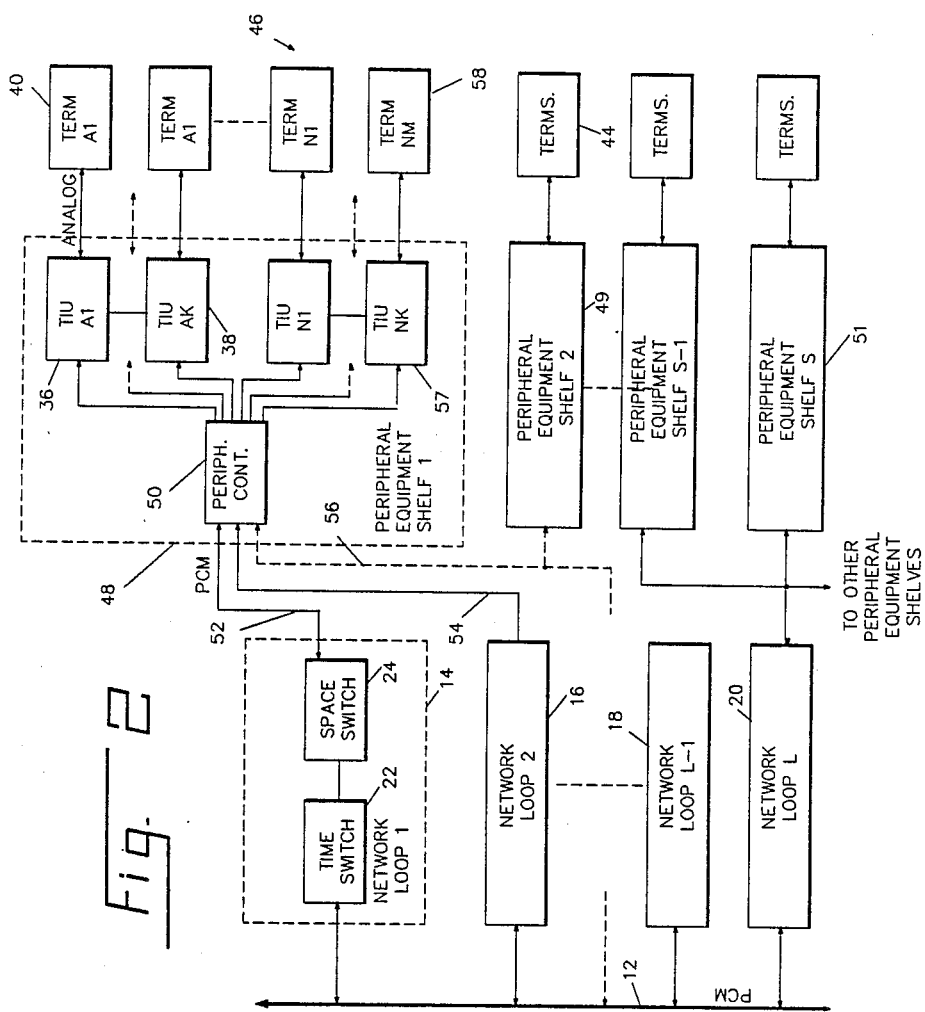
FIG. 2 is a simplified block diagram of a PBX system according to an embodiment of the invention.

Referring now to FIG. 2, there is shown, generally at 46, a PBX system according to an embodiment of the invention. A plurality of network loops 14, 16, 18 and 20 communicate PCM signals with network bus 12, as in the prior-art embodiment. A peripheral equipment shelf 48 includes a peripheral controller 50 receiving PCM signals on PCM lines 52, 54 and 56 from network loops 14 and 16, as well as from other network loops. In turn, peripheral controller 50 communicates with all terminal interface units 36–57 in peripheral equipment shelf 48. As in the prior embodiment, each of terminal interface units 36–57 communicates with one of terminals 40–58. It will be noted that peripheral controller 50 substitutes for the peripheral buffer in the prior-art embodiment in FIG. 1.

For purposes of the following description, it is assumed that peripheral controller 50 communicates with three network loops, and that the communications capacity of 70 channels, selected from three network loops, is served by peripheral equipment shelf 48.

Referring now to FIG. 3, a network interface 58 receives all of the PCM data in channels (time slots) addressed to terminals 40-58 for a total of three network loops (not shown in FIG. 3). Such channels may be, for example, all the thirty channels from each of the first and second network loops, and ten channels from the third network loop, for a total of 70 channels. The remaining 20 channels of the third network loop (along with additional channels from other network loops) can be utilized on the next peripheral equipment shelf. The data bits of the three loops are applied to a channel-merge device 60, wherein the data bits are buffered and merged into a contiguous data stream for application on a line 62 to a time switch 64. A connection memory 66 retains a data library relating the addresses of particular terminals with the channel sources. Time switch 64, under guidance of connection memory 66, makes the appropriate connections of channels from the three network loops with appropriate ones of terminals via terminal interface units 36–57. As in the prior-art embodiment, each terminal interface unit serves the requirements of one or more terminals.

Connection memory 66 may be implemented using any convenient technology. In the preferred embodiment, connection memory 66 is a read/write random access memory which is updated by call processing software whenever a call is established or torn down. The software also ensures that any channel on the third loop which is used on peripheral equipment shelf 48 is not used on peripheral equipment shelf 49, and vice versa.

It is foreseen that the relationship between specific channels of network loops and particular peripheral equipment shelves will be established upon installation of PBX system 46, and will remain substantially unchanged through the useful life of PBX system 46.

The foregoing should not be taken to mean that the allocation of communications resources cannot be changed. On the contrary, if historic usage of PBX system 46 indicates a GOS on a peripheral equipment shelf that is substantially above or below an acceptable level, the number of network loops, and thus channels serving that peripheral equipment shelf, may be changed until a target GOS is attained.

From a system standpoint, the present invention, as shown in FIGS. 2 and 3, and described above, substantially eliminates lost channel capacity and wasted cost, space and power in peripheral equipment shelves. That is, channel assignments can be selected from those available on network bus 12, which are capable of using all available space on peripheral equipment shelf 48. Once the CCS of terminals serviced by peripheral equipment shelf 48 are completely assigned, other channels are assigned to the next peripheral equipment shelf 49 until its CCS capacity is completely assigned. This process continues until the last peripheral equipment shelf 51. This last peripheral equipment shelf 51 is assigned the remaining channel capacity.

It will be evident to one skilled in the art that space in last peripheral equipment shelf 51 may be underused. However, this underutilization takes place only once per system rather than once per network loop. This represents a substantial improvement in the utilization of resources.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A PBX system of a type including a bus for carrying digital data, comprising:
   at least first and second network loops;
   each of said first and second network loops including a first time switch and a space switch for communicating said digital data with said bus;
   at least one peripheral shelf;
   said at least one peripheral shelf including a peripheral controller;
   first means for communicating first digital data between said first network loop and said peripheral controller;
   second means for communicating second digital data between said second network loop and said peripheral controller;
   means in said peripheral controller for combining said first and second digital data into a single third digital data;
   a plurality of terminals;
   a second time switch in said peripheral controller for directing portions of said third digital data to specific ones of said terminals; and
   a connection memory for relating said portions of said third digital data with said specific ones of said plurality of terminals, whereby a desired communications path is attainable.

2. A PBX system according to claim 1, wherein said third digital data includes first selected channels from said first network loop and second selected channels from said second network loop.

3. A PBX system according to claim 2, wherein said first selected channels include less than all of said first digital data.

4. A PBX system according to claim 3, further comprising:
   a second peripheral shelf;

said second peripheral shelf including a second peripheral controller; and at least a third selected channels of said second digital data being connected to said second peripheral shelf.

5. A peripheral controller for a PBX system comprising:

means for accepting a first plurality of channels of first digital data from a first network loop;

means for accepting a second plurality channels of second digital data from a second network loop;

means for combining said first plurality of channels with said second plurality of channels to produce a third digital data;

means for communication portions of said digital data with at least first and second terminals; and said means for communicating including a time switch.

6. Apparatus according to claim 5, wherein said means for combining includes means for merging said first and second digital data to form said third digital data.

7. Apparatus according to claim 6, wherein said means for merging includes a multiplexer.

8. A PBX system of a type comprising:

a bus for carrying digital data;

at least first and second network loops;

each of said first and second network loops including a first time switch and a space switch for communicating said digital data with said bus;

at least one peripheral shelf;

said at least one peripheral shelf including a peripheral controller;

first means for communicating first digital data between said first network loop and said peripheral controller;

second means for communicating second digital data between said second network loop and said peripheral controller;

means in said peripheral controller for combining said first and second digital data into a single third digital data;

a plurality of terminals;

a second time switch in said peripheral controller for directing portions of said third digital data to specific ones of said terminals; and a connection memory for relating said portions of said third digital data with said specific ones of said plurality of terminals, whereby a desired communications path is attainable.

* * * * *